Jan. 15, 1957 A. L. TUCKER 2,777,709
LOAD EQUALIZING WHEEL MOUNTING FOR COMPACTORS
Filed Dec. 21, 1955 3 Sheets-Sheet 1

Arthur L. Tucker
INVENTOR.

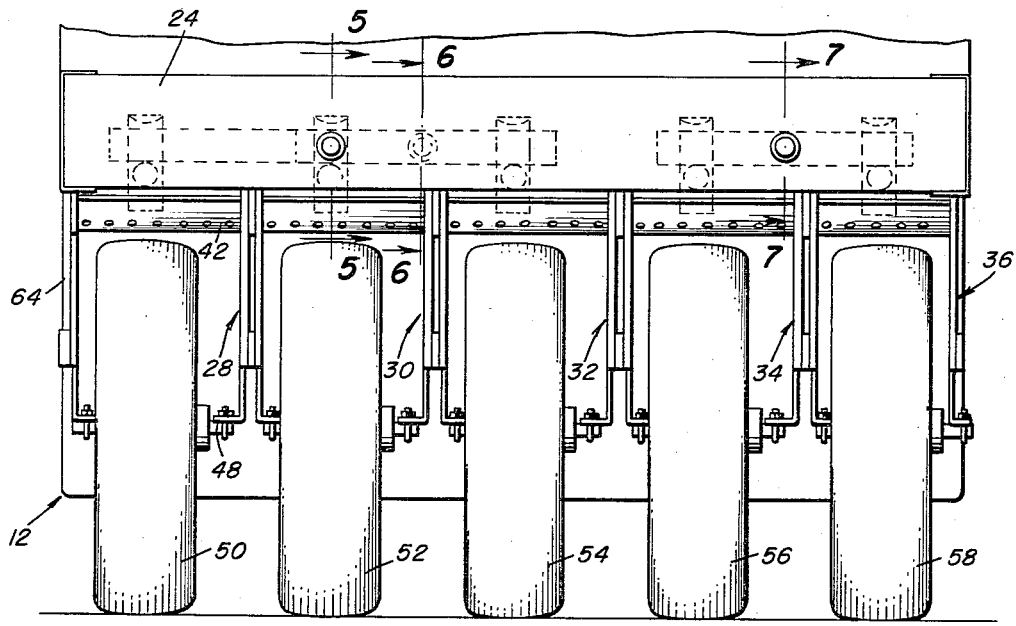
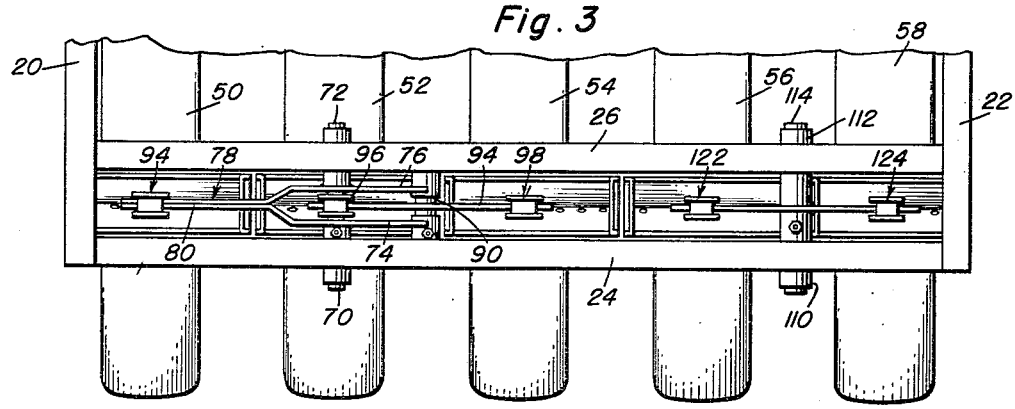
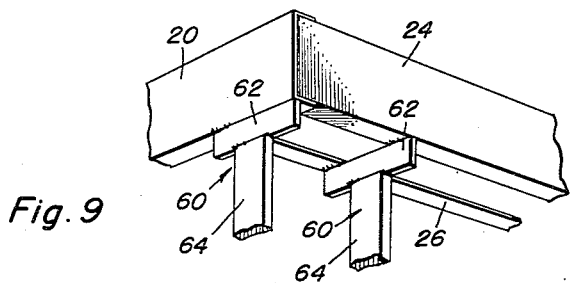

Jan. 15, 1957   A. L. TUCKER   2,777,709
LOAD EQUALIZING WHEEL MOUNTING FOR COMPACTORS
Filed Dec. 21, 1955   3 Sheets-Sheet 3
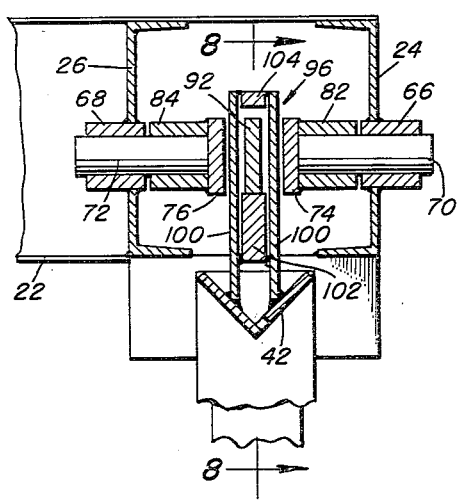
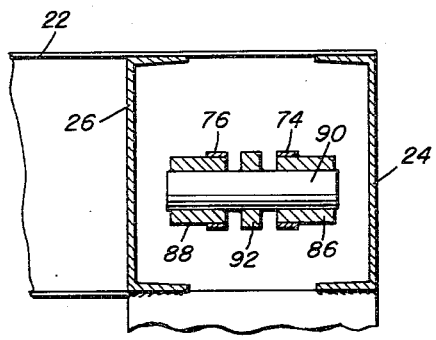
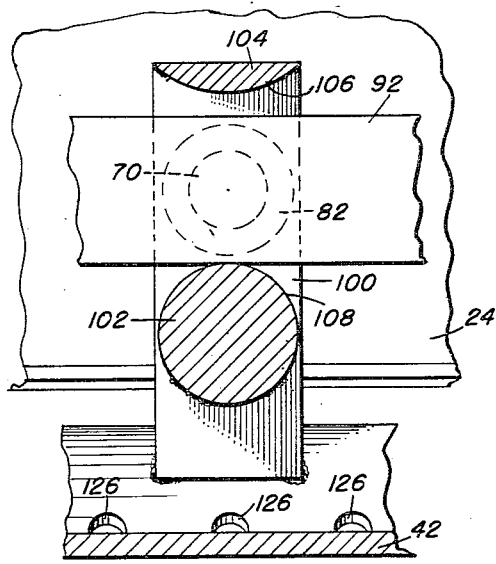
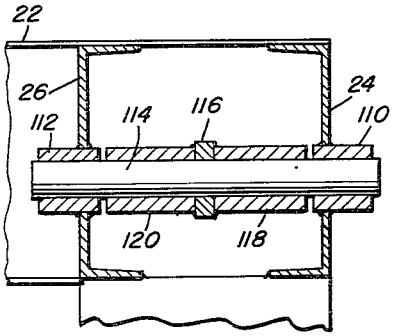
Arthur L. Tucker
INVENTOR.

United States Patent Office 2,777,709
Patented Jan. 15, 1957

2,777,709

LOAD EQUALIZING WHEEL MOUNTING FOR COMPACTORS

Arthur L. Tucker, Oklahoma City, Okla.

Application December 21, 1955, Serial No. 554,526

6 Claims. (Cl. 280—104)

This invention relates in general to new and useful improvements in vehicles, and more specifically to new and useful improvements in wheel mountings for vehicles.

In certain types of vehicles, particularly compactors, it is desired that all of the wheels remain in engagement with the ground at all times, if it is at all possible. At the same time, it is desirable that each wheel take its proportional share of the load of the vehicle. One of the primary purposes of this desired arrangement is to prevent any one wheel from taking an excessive amount of the weight of the vehicle whereby the wheel may be damaged or the tire thereof blown up. It is therefore the primary object of this invention to provide an improved wheel mounting which is so constructed whereby at least two wheels are mounted upon a single pivot which is of the low transmitting type so that as one wheel has a tendency to move upwardly, the other wheel of the pair will move downwardly and thereby permit the two wheels to equalize in their load or strain.

Another object of this invention is to provide an improved wheel mounting which includes means for relative movement of a wheel to vertical movement and at the same time permitting the transmittal of load to the wheel through the pivoted bar assembly.

Another object of this invention is to provide an improved wheel mounting which includes transverse load transmitting bars having connected thereto wheel supports mounted for vertical movement only, the load transmitting bars being pivotally mounted and being engaged by the wheel supports in such a manner so that as one wheel support moves upwardly, due to the movement of its wheel over an uneven terrain, the load transmitting bar is pivoted so as to urge the other or other wheel supports connected thereto downwardly, thereby providing the load transmitted from the load transmitting bar to the wheels through their respective supports.

Another object of this invention is to provide an improved wheel mounting for compactors, the wheel mounting being of such a nature whereby the wheels of a compactor will compact uneven surfaces, including high and low spots, to uniform density.

Another object of this invention is to provide an improved wheel mounting for compactors and the like, the wheel mountings being limited to vertical movement so as to avoid scuffing of the tires of the wheels and to reduce tilting of the load.

A further object of this invention is to provide an improved wheel mounting for vehicles which permits a vertical movement only of the wheels and utilizes a cantilever load transfer whereby the chances of driving wheels of a vehicle not contacting the surface and causing stalling and spinning is eliminated.

A still further object of this invention is to provide an improved wheel mounting assembly for heavy vehicles, the wheel mounting assembly being such that the movement of the wheels is limited to vertical movement and at the same time the load transmitted to the wheel is equalized whereby side thrust on the bearings of the wheels, on the wheels and their tires is greatly reduced.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 2 is an end view of the compactor of Figure 1 as viewed from the right and shows the general arrangement of the wheels thereof;

Figure 3 is an enlarged fragmentary top plan view of the right end of the compactor of Figure 1 and shows the general arrangement of load transmitting means for transmitting the load of the compactor to the wheels;

Figure 5 is an enlarged fragmentary vertical sectional view taken substantially upon the plane indicated by the section line 5—5 of Figure 2 and shows the specific details of the relationship between a pair of load transmitting bars which carry the wheel supports;

Figure 6 is an enlarged fragmentary vertical sectional view taken substantially upon the plane indicated by section line 6—6 of Figure 2 and shows the specific details of the pivotal mounting of another of the load transmitting bars;

Figure 7 is an enlarged fragmentary vertical sectional view taken substantially upon the plane indicated by the section line 7—7 of Figure 2 and shows the details of a still further pivotal connection between the load transmitting bar and the frame of the compactor;

Figure 8 is an enlarged fragmentary vertical sectional view taken substantially upon the plane indicated by the section line 8—8 of Figure 5 and shows the details of the anti-friction connection between the connecting means of one of the wheel supports and one of the load transmitting bars; and Figure 9 is an enlarged fragmentary perspective view of the underside of the frame showing the details of guide members for the wheel supports.

Figure 1:
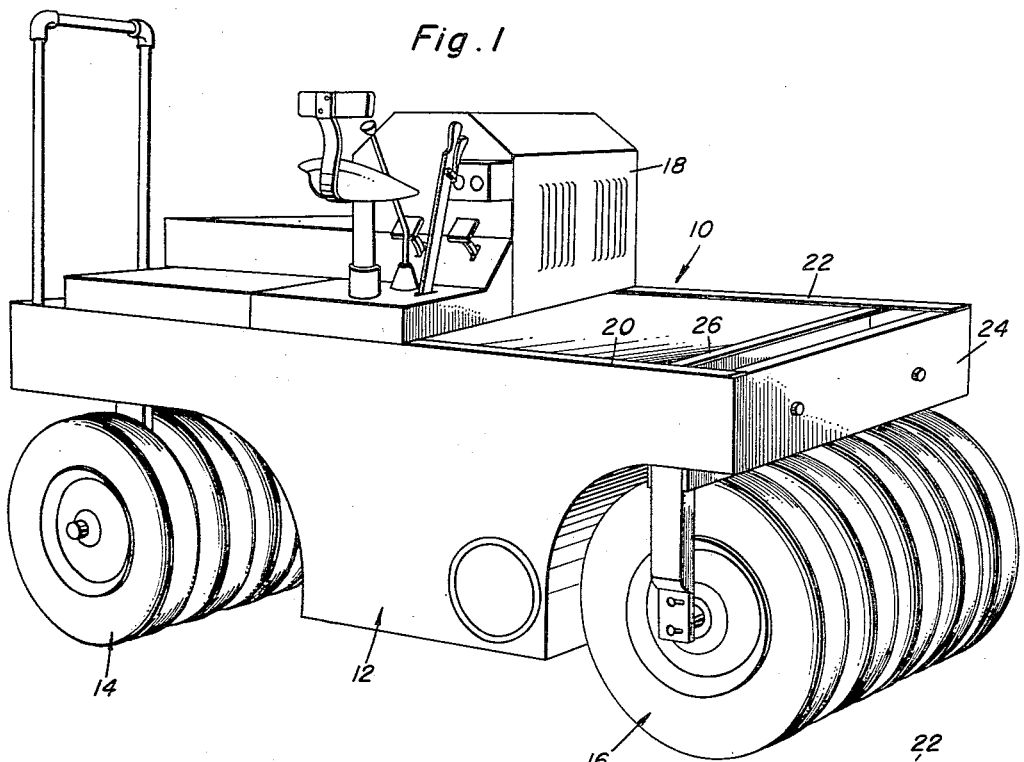
Figure 1 is a perspective view of a compactor employing the wheel mounting which is the subject of this invention and shows the general details thereof.

Referring now to the drawings in detail, it will be seen that there is illustrated in Figure 1 a compactor which is referred to in general by the reference numeral 10. The compactor 10 is one of the many vehicles which may utilize the wheel mounting which is the subject of this invention and has been selected as an example only of such a vehicle which would utilize the invention. The compactor 10 includes a frame which is referred to in general by the reference numeral 12. The frame 12 is supported by a steerable set of wheels 14 and by a fixed set of wheels 16. If desired, the compactor 10 may be drawn. However, it is illustrated as being provided with a power unit 18 which may be conveniently connected to the fixed set of wheels 16 for driving the compactor 10. However, the details of the drive connection between the power unit 18 and the fixed set of wheels 16 have been omitted for purposes of clarity inasmuch as they play no part in the present invention.

The frame 12 includes a pair of longitudinal side frame members 20 and 22 which are connected together by an end frame member 24 in the vicinity of the fixed set of wheels 16. A similar frame member 26 extends between the frame rails 20 and 22, the frame member 26 being disposed toward the center of the compactor 10 from the frame member 24. The frame rails 20 and 22 and the frame members 24 and 26 have been illustrated as being of channel cross-section although they may be of other configuration if desired.

Inasmuch as the present invention is incorporated in the rear set of wheels 16 only, the description of the wheel assemblies and the compactor 10 will be limited to that set of wheels.

The fixed set of wheels 16 includes a plurality of transversely spaced aligned wheel supports, the wheel supports being disposed closely adjacent each other. The wheel supports include wheel supports 28, 30, 32, 34, and 36 as viewed from the left to the right in Figure 4. The wheel supports 28, 30, 32, 34 and 36 are identical except for their position relative to the frame 12. Accordingly, the details of only the wheel support 28 will be set forth hereinafter.

The wheel support 28 is generally of the yoke type and includes a pair of transversely spaced channel members 38 and 40 which are open in opposite directions. The upper ends of the channel members 40 are connected together by a transversely disposed V-shaped cross-sectional member 42. The flanges of the channel-shaped members 38 and 40 are terminated above the lower ends thereof and the webs of the channel-shaped members 38 and 40 are turned inwardly in opposed direction to form mounting flanges 44 and 46, respectively, which are horizontally disposed. Connected to the mounting flanges 44 and 46 are suitable axles 48 carrying a wheel 50. Although it has not been specifically illustrated, if desired, the wheel 50 may be provided with a suitable sprocket so that it may be driven through a chain drive from the power unit 18.

In addition to the wheel 50, the fixed set of wheels 16 includes a wheel 52, a wheel 54, a wheel 56, and a wheel 58, the wheels 52, 54, 56 and 58 being carried by the wheel supports 30, 32, 34, and 36, respectively.

Referring now to Figure 9 in particular, it will be seen that there is secured to the undersides of the frame members 24 and 26 transversely spaced guide members which are referred to in general by the reference numeral 60. Each guide member 60 includes a longitudinally extending mounting plate 62 whose upper edge is secured by welding to the undersides of the frame members 24 and 26. Secured to the lower edge of each plate 62 centrally thereof in depending relation is a guide element 64. Each guide element 64 is received in one of the channel members of one of the wheel supports. It is to be understood that except for the endmost ones of the guide elements 64, the guide elements 64 will be received in a pair of the channel members, such as the channel members 38 and 40, to simultaneously guide opposite sides of a pair of wheel supports.

Figure 4:
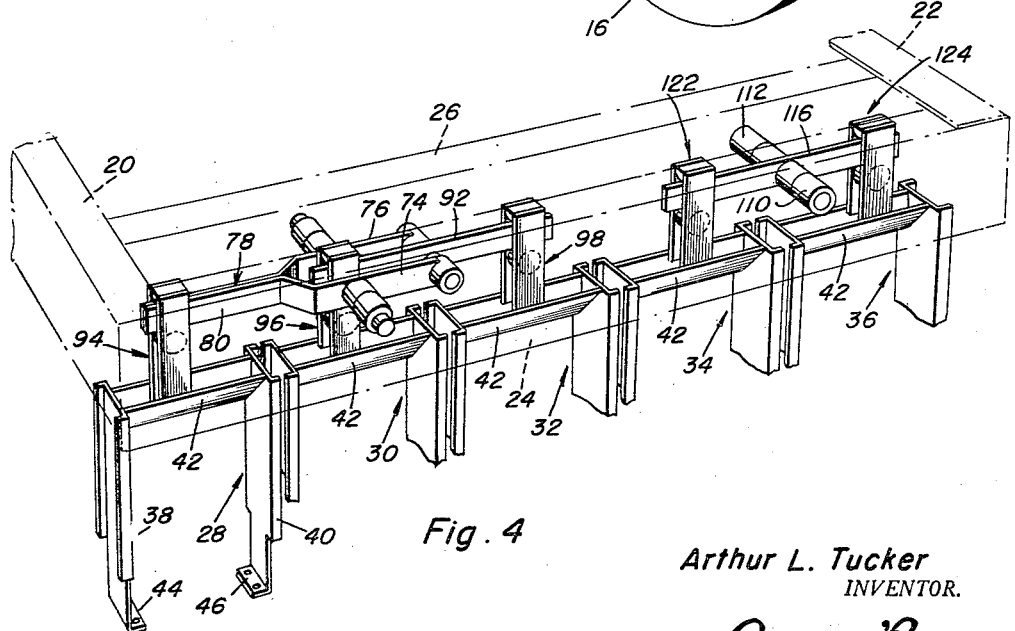
Figure 4 is an enlarged fragmentary perspective view showing the specific details of the wheel mounting including the wheel supports and the load transmitting means, the frame of the compactor being shown in dotted lines.

As is best illustrated in Figure 4, the wheel supports 28, 30, 32, 34 and 36 are mounted in groups. The wheel supports 28, 30 and 32 form one group, while the wheel supports 34 and 36 form the second group. The mounting of the wheel supports 28, 30 and 32 will be described in detail first.

Referring now to Figures 4 and 5 in particular, it will be seen that the frame members 24 and 26 are provided with longitudinally aligned bushings 66 and 68, respectively, in which there are mounted pivot pins 70 and 72, respectively. The pivot pins 70 and 72 are longitudinally aligned and are secured to bifurcated legs 74 and 76, respectively, of a transverse load transmitting bar which is referred to in general by the reference numeral 78. The load transmitting bar 78 is of the bifurcated type and the legs 74 and 76 are joined together intermediate their ends to form a relatively thick leg 80. It is to be understood that the load transmitting bar 78 is mounted for pivotal movement on the pivot pins 70 and 72. The pivot pins 70 and 72 also carry suitable spacers 82 and 84, respectively, which are secured to the legs 74 and 76.

Referring now to Figures 4 and 6 in particular, it will be seen that there is carried by the right hand ends of the legs 74 and 76, these ends being the free ends of the legs 74 and 76, a pair of longitudinally aligned bushings 86 and 88, respectively. Extending between the bushings 86 and 88 is a pivot pin 90. Secured to the pivot pin 90 and mounted thereon for pivotal movement is the central portion of a load transmitting bar 92 which is also transversely disposed and which has one end thereof disposed between the legs 74 and 76.

Extending upwardly from the V-shaped members 42 of the wheel supports 28, 30 and 32 are connecting means in the form of connectors 94, 96 and 98, respectively. Inasmuch as the connectors 94, 96 and 98 are identical in detail, only the connector 96 will be described in detail hereinafter.

Referring now to Figures 5 and 8 in particular, it will be seen that the connector 96 includes a pair of longitudinally spaced, transversely disposed straps 100 whose lower ends are welded to the inner surface of the respective V-shaped cross-sectional member 42. The lower portions of the bars 100 are connected together by a circular cross-sectional spacer 102. A quarter spacer 104 is positioned between the upper ends of the bars 100 and secured thereto. It is to be noted that the quarter spacer 104 has a lower curved surface 106, whereas the spacer 102 presents an upper curved surface 108. The surfaces 108 and 106 are spaced apart a distance slightly greater than the heights of the load transmitting bars 78 and 92.

The connector 94 is disposed over the left hand end of the load transmitting bar 78 and the connector 98 is disposed over the right hand end of the load transmitting bar 94. The connector 96 is aligned with the pivot pins 70 and 72 and is disposed over the left hand end of the load transmitting bar 92.

Assuming that the wheel 50 rides over a high spot, then, through the connector 94, the wheel support 28 will pivot the load transmitting bar 78 in a clockwise direction about the pivot pins 70 and 72. This will cause the pivot pin 90 to move downwardly, thereby forcing the center of the load transmitting bar 92 downwardly. This will result in the downward urging of the wheel supports 30 and 32 through the connectors 96 and 98. Thus, the wheels 52 and 54 will be forced downwardly towards the road surface or other surface over which the wheels are running so that the loading on the wheels 50, 52 and 54 will remain substantially the same. In the event the wheel 50 should run on a low spot, the reverse will happen.

Assuming now that the wheel 54 runs over a high spot, the right end of the load transmitting bar 92 will be urged upwardly by the connector 98. This will result in the pivoting of the load transmitting bar 92 about the pivot pin 90 so as to urge the wheel support 30 downwardly. Further, the pivot pin 90 will have a tendency to move upwardly, thereby forcing the wheel support 28 downwardly. This will again equalize the load on all of the wheels 50, 52, and 54. The action caused by the wheel 52 will be the same as that caused by the wheel 54.

Referring now to Figures 4 and 7 in particular, it will be seen that the frame members 24 and 26 are provided with longitudinally aligned bushings 110 and 112, respectively, in which there is journaled a pivot pin 114. The pivot pin 114 is disposed centrally between the wheel supports 34 and 36. Mounted on the pivot pin 114 is the central portion of a transversely disposed load transmitting bar 116. The load transmitting bar 116 has welded thereto spacers 118 and 120 which are also journaled on the pivot pin 114.

Connected to the V-shaped cross-sectional members 42 of the wheels supports 34 and 36 are connectors 122 and 124, respectively. The connectors 122 and 124 are identical with the connector 96 and need not be described in more detail hereinafter. The connector 122 is disposed on the left end of the load transmitting bar 116 while the connector 124 is disposed over the right end of the load transmitting bar 116.

When the wheel 58 runs over a high spot, the wheel support 36 is urged upwardly and the load transmitting bar 116 is pivoted in a counter-clockwise direction about the pivot pin 114 by the connector 124. This urges the connector 122 downwardly to force the wheel support 34 downwardly. Downward movement of the wheel support 34 urges the wheel 56 into contact with the ground so that the wheels 56 and 58 again take equal loads. The action of the wheel 56 will be the same as that as described with respect to the wheel 58.

It is to be noted that the two sets of wheel mountings differ slightly in structure but operate on the same principle. Such principle could be extended to sets of wheels in excess of three. However, it is believed that three wheels mounted in a set produces the best result, and any attempt to mount more, while such a mounting will function properly, requires quite a complicated linkage. By providing wheel mountings in sets of twos and threes, any desired number of wheels may be mounted on a compactor or other vehicle.

It is pointed out at this time that each of the various wheel supports 28 is limited to vertical movement. This avoids scuffing and reduces the tilting of the load, and it reduces side thrust on the bearings, wheels and tires. While the movement of the wheel supports 28, 30, 32, 34, and 36 is limited to vertical movement, the drag between the connectors and the various load transmitting bars is reduced to a minimum by the use of the curved surfaces on the spacers 102 and 104.

It will be readily apparent that the V-shaped cross-sectional members 42 could be of other cross-section. However, by utilizing the V-shaped cross section, the members 42 are in the form of troughs. The members 42 are provided with longitudinally spaced openings 126 in the bottom part thereof. Thus, the members 42 may properly function as troughs and water may be poured thereinto so as to run down onto the tires of the various wheels from the openings 126 so as to moisten the wheels as may be necessary during a compacting operation to prevent sticking and the like.

From the foregoing description of the invention, it will be readily apparent that there has been devised a multiple wheel mounting which is such that the load of a vehicle may be equally distributed over a series of wheels and that excessive concentration of load on any one wheel is prevented even though the wheels may run over uneven ground.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A wheel mounting comprising three transversely spaced wheel supports, a first transverse load transmitting bar mounted for pivotal movement on a first pivot, connecting means connecting an adjacent pair of said wheel supports to opposite ends of said first load transmitting bar, a second transverse load transmitting bar mounted for pivotal movement on a second pivot, other connecting means connecting the other of said wheel supports to one end of said second load transmitting bar, said first pivot being carried by the opposite end of said second load transmitting bar, said other end of said second load transmitting bar being bifurcated, one of said ends of said first load transmitting bar being disposed within the confines of said second load transmitting bar.

2. A wheel mounting comprising three transversely spaced wheel supports, a first transverse load transmitting bar mounted for pivotal movement on a first pivot, connecting means connecting an adjacent pair of said wheel supports to opposite ends of said first load transmitting bar, a second transverse load transmitting bar mounted for pivotal movement on a second pivot, other connecting means connecting the other of said wheel supports to one end of said second load transmitting bar, said first pivot being carried by the opposite end of said second load transmitting bar, said other end of said second load transmitting bar being bifurcated, one of said ends of said first load transmitting bar being disposed within the confines of said second load transmitting bar, said first pivot being disposed centrally of said first load transmitting bar.

3. A wheel mounting comprising three transversely spaced wheel supports, a first transverse load transmitting bar mounted for pivotal movement on a first pivot, connecting means connecting an adjacent pair of said wheel supports to opposite ends of said first load transmitting bar, a second transverse load transmitting bar mounted for pivotal movement on a second pivot, other connecting means connecting the other of said wheel supports to one end of said second load transmitting bar, said first pivot being carried by the opposite end of said second load transmitting bar, said other end of said second load transmitting bar being bifurcated, one of said ends of said first load transmitting bar being disposed within the confines of said second load transmitting bar, said second pivot being aligned with said connecting means of the centralmost of said wheel supports.

4. A wheel mounting comprising three transversely spaced wheel supports, a first transverse load transmitting bar mounted for pivotal movement on a first pivot, connecting means connecting an adjacent pair of said wheel supports to opposite ends of said first load transmitting bar, a second transverse load transmitting bar mounted for pivotal movement on a second pivot, other connecting means connecting the other of said wheel supports to one end of said second load transmitting bar, said first pivot being carried by the opposite end of said second load transmitting bar, said other end of said second load transmitting bar being bifurcated, one of said ends of said first load transmitting bar being disposed within the confines of said second load transmitting bar, said first pivot being disposed centrally of said first load transmitting bar, said second pivot being aligned with said connecting means of the centralmost of said wheel supports.

5. A wheel mounting comprising three transversely spaced wheel supports, a first transverse load transmitting bar mounted for pivotal movement on a first pivot, connecting means connecting an adjacent pair of said wheel supports to opposite ends of said first load transmitting bar, a second transverse load transmitting bar mounted for pivotal movement on a second pivot, other connecting means connecting the other of said wheel supports to one end of said second load transmitting bar, said first pivot being carried by the opposite end of said second load transmitting bar, guide means engaged with said wheel support for limiting movement of said wheel supports to vertical movement only, said wheel supports each including a pair of channel members, a connecting bar connecting together upper ends of said channel members, wheel connecting means at lower ends of said channel members, said guide means being positioned in said channel members.

6. A wheel mounting comprising three transversely spaced wheel supports, a first transverse load transmitting bar mounted for pivotal movement on a first pivot, connecting means connecting an adjacent pair of said wheel supports to opposite ends of said first load transmitting bar, a second transverse load transmitting bar mounted for pivotal movement on a second pivot, other connecting means connecting the other of said wheel supports to one end of said second load transmitting bar, said first pivot being carried by the opposite end of said second load transmitting bar, guide means engaged with said wheel support for limiting movement of said wheel supports to vertical movement only, said wheel supports each including a pair of channel members, a connecting bar connecting together upper ends of said channel members, wheel connecting means at lower ends of said channel members, said guide means being positioned in said channel members, said connecting means including antifriction elements disposed above and below said load transmitting bar ends whereby relative movement between said connecting means and said load transmitting bar during pivoting of said load transmitting bar is facilitated.

References Cited in the file of this patent

UNITED STATES PATENTS

| | | |
|---|---|---|
| 2,208,600 | Ronning | July 23, 1940 |
| 2,398,248 | Reid | Apr. 9, 1946 |

FOREIGN PATENTS

| | | |
|---|---|---|
| 681,325 | Great Britain | Oct. 22, 1952 |